United States Patent [19]
Fischer

[11] Patent Number: 6,139,086
[45] Date of Patent: Oct. 31, 2000

[54] CABRIOLET VEHICLE HAVING A ROOF HANDHOLD ARRANGEMENT

[75] Inventor: Gerd Fischer, Braunschweig, Germany

[73] Assignee: Volkswagen AG, Wolfsburg, Germany

[21] Appl. No.: 09/263,287

[22] Filed: Mar. 5, 1999

[30] Foreign Application Priority Data

Mar. 5, 1998 [DE] Germany ............................ 198 09 448

[51] Int. Cl.$^7$ .................................................. B60R 13/01
[52] U.S. Cl. .............................. 296/107.01; 296/107.06; 296/214
[58] Field of Search ..................... 296/107.01, 107.06, 296/214

[56] References Cited

U.S. PATENT DOCUMENTS

| 5,403,064 | 4/1995 | Mahler et al. ........................... 296/214 |
| 5,662,375 | 9/1997 | Adams et al. ........................... 296/214 |
| 5,855,408 | 1/1999 | Rickabus ........................... 296/97.1 X |

FOREIGN PATENT DOCUMENTS

| 2717889 | 10/1978 | Germany . |
| 424148 | 2/1992 | Germany . |
| 297 07 036 U | 3/1993 | Germany . |
| 3817769 | 1/1995 | Germany . |
| 196 08 275 | 10/1996 | Germany . |
| 807474 | 5/1998 | Germany . |
| 128748 | 4/1997 | United Kingdom . |

*Primary Examiner*—Joseph D. Pape
*Attorney, Agent, or Firm*—Baker Botts L.L.P.

[57] ABSTRACT

A vehicle having a roof handhold arrangement includes an openable and collapsible cabriolet roof with an elastically deformable handhold connected at each end to handhold attachment points on lateral structural members of a collapsible roof. The collapsible roof is collapsible at least between the handhold attachment points, reducing the distance between them, and the handhold is foldable into a roof fold extending transverse to the longitudinal direction of the vehicle and bulging toward the outside of the roof. Upon collapse of the cabriolet roof by the opposed motion of the handhold attachment points, the handhold is deformable from a service position into a storage position in a transverse fold region of the roof.

9 Claims, 1 Drawing Sheet

CABRIOLET VEHICLE HAVING A ROOF HANDHOLD ARRANGEMENT

BACKGROUND OF THE INVENTION

This invention relates to vehicles, such as cabriolet passenger motor vehicles, having a collapsible roof with a roof handhold.

In passenger motor vehicles having a fixed roof, roof handholds are frequently provided in the neighborhood of the seat positions. Such handholds are fixed in the interior of the vehicle to the longitudinal side roof frame members, or "longerons". Roof handholds are useful functional parts, of a vehicle serving primarily to assist passengers getting in and out of the vehicle.

Simple forms of conventional roof handholds include a plastic strip which is fastened at both ends to the roof longeron so that the plastic strip bulges into the vehicle interior to provide a handhold.

In modern passenger vehicles, spring-loaded hinged arcuate handles capable of being pivoted into recesses of the interior trim are commonly provided as roof handholds. These hinged handles are fixed rigid parts, capable of being moved into their recesses for reasons of safety when not in use.

"Convertible" vehicles having folding cabriolet roofs, however, have no fixed roof frame structure with stationary roof longerons. Consequently, the normal fixed support and attachment points for a roof handhold are absent. Moreover, conventional roof handhold designs would interfere with compact collapse of a cabriolet roof, and might cause damage to the roof. As a result, there are no conventional roof handholds for cabriolet vehicles.

SUMMARY OF THE INVENTION

Accordingly, it is an object of the present invention to provide a vehicle having a folding roof with a roof handhold arrangement which overcomes disadvantages of the prior art.

Another object of the invention is to provide a suitable roof handhold arrangement and configuration for a cabriolet-type vehicle.

Theses and other objects of the invention are attained by providing a vehicle having an openable and foldable roof with a roof handhold having an elastically deformable handhold part connected at each end at point of attachment to transverse structural elements of the roof. The cabriolet roof is collapsible for storage by folding into transverse roof folds, and may commonly be stored in the rear region of the vehicle. For a roof handhold, it is necessary that the cabriolet roof be collapsible between the points of handhold attachment and the handhold must be deformable into a roof fold extending transverse to the longitudinal direction of the vehicle and convex toward the outside of the roof. The deformable handhold, upon collapsing of the cabriolet roof, is deformed outwardly by movement of the points of handhold attachment toward each other from a service position to a storage position and is stored in a fold of the roof material.

With this arrangement, the provision of a useful roof handhold for a cabriolet roof is made possible. Since, upon collapsing of the cabriolet roof, the handhold deforms elastically into a fold of the roof material and is stored there, the handhold does not interfere with the folding of the roof and will advantageously fit compactly together with the folded roof for storage. Furthermore, because of the deformability of the handhold, there is no danger of damage to the folding roof material. Also, the deformability of the handhold may be selected so that, in a collision, the impact of an occupant's head on the roof handhold involves no risk of injury. With suitable configuration of the roof handhold and suitable deformability, the handhold may even constitute a safety element for a cushioned head impact.

The cabriolet roof itself is preferably constructed in a conventional manner with articulated longitudinal and/or transverse frame members with at least one web of foldable material stretched over them as canopy. The points of handhold attachment are preferably located on the longitudinal and/or transverse frame members. This provides fixed points of support for the roof handhold, with provisions for attachment under defined conditions for the folding of the roof and bending of the handhold.

Quality cabriolet roofs are normally made in two layers with spaced webs of fabric for an outer skin and an inner skin. The fabrics used are preferably coated textile materials. When the cabriolet roof is collapsed both the outer skin and the inner skin are folded in the same direction. With such roof configurations, the handhold and its points of attachment are located below the inner skin.

To achieve predetermined folding and bulging effect for the handhold with little effort, articulations are provided at the points of handhold attachment and/or in at least one intermediate portion of the handhold. Such articulations may be simply and economically provided by hinges formed from flexible material.

The spacing of the points of handhold attachment when the cabriolet roof is opened into the service position is preferably somewhat less that the extended length of the handhold so that the handhold will arch into the interior of the vehicle in position for use. In this way, the handhold is easily reached and grasped and is held in position for use. Alternatively, however, the handhold may be mounted in a straight, extended position, and provision made for grasping it by a suitable indentation of the adjacent roof region.

In an especially preferred embodiment, the articulations, preferably in the form of hinges made of flexible material, and/or the handhold itself, are designed so that there are preferential directions of deformation. Such preferential directions of deformation may be effected in a conventional manner by single or combined steps in the nature of thinning of the material, stops, tabs, differential elasticities and composite materials. The preferential directions of deformation are arranged to act so that, when the cabriolet roof is collapsed for storage, the handhold changes from an original arch shape directed toward the interior of the vehicle to a bulge in the opposite direction toward the outside of the roof so as to extend into a folded portion of the roof material. When the cabriolet roof is returned to the service position, the original arch shape directed toward the interior of the vehicle is restored, putting the handhold in the position for use. In addition, conventional snap effects may be employed for changing the handhold from one position to the other.

In an economical and functional embodiment, the handhold may simply constitute a flat strip with segments diverging toward the bulge direction providing a defined bulge requiring little expenditure of effort.

The stability, durability and deformability required for the handhold are preferably achieved by providing a handhold structure having a woven nylon core and a plastic jacket.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
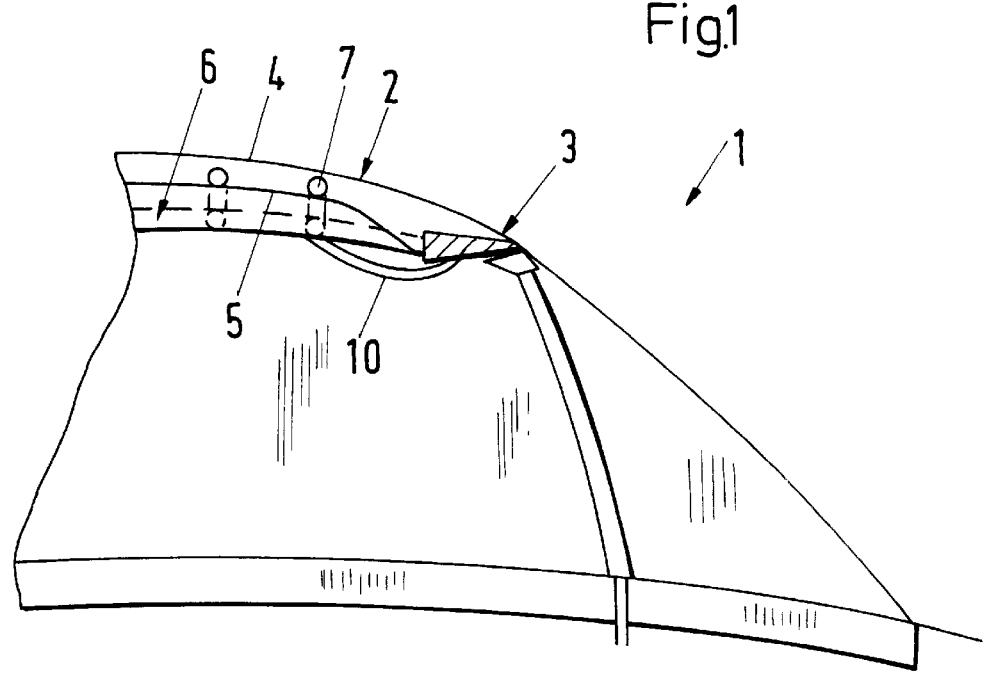
FIG. 1 is a schematic view showing a front portion of a cabriolet vehicle having a roof handhold.

In the typical embodiment of the invention schematically shown in the drawings, a cabriolet vehicle 1, a front portion of which is shown in FIG. 1, has a cabriolet roof 2 which is shown in an open, service position 3. As seen especially in FIG. 2, the cabriolet roof 2 has two layers including an outer skin 4 and an inner skin 5.

Figure 2:
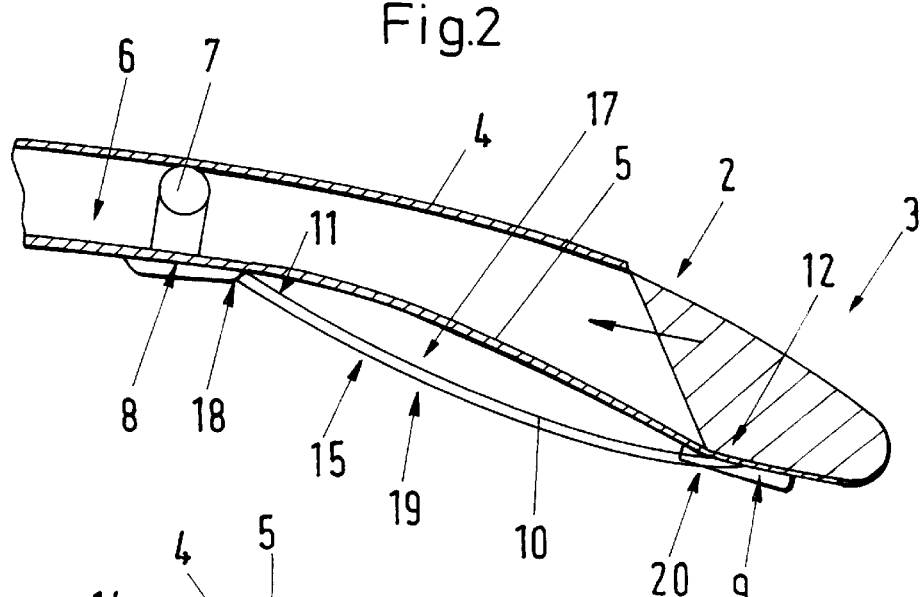
FIG. 2 is a schematic sectional view of a roof portion of the vehicle with a roof handhold in service position.

The cabriolet roof 2 further includes conventional articulately-connected longitudinal frame members 6 and transverse frame members 7. In the region of the forward longitudinal frame members 6 and transverse frame members 7, two points of attachment for a handhold are provided, to which an elastically deformable handhold 10 having a flat strip configuration is attached at its opposite ends 11 and 12. As shown in FIGS. 1 and 2, both the handhold 10 and its points of attachment 8 and 9 are located below the inner skin 5 of the cabriolet roof 2.

The construction of the handhold 10 includes a core of nylon fabric and a plastic jacket.

As also shown in FIGS. 1 and 2, the spacing between the points of handhold attachment 8 and 9 with the cabriolet roof 2 open in service position is somewhat less that the full length of the handhold 10, so that the handhold 10 in its service position 15 has an arched shape extending into the interior of the vehicle. With this arrangement the handhold 10 is easily reached and grasped.

Figure 3:
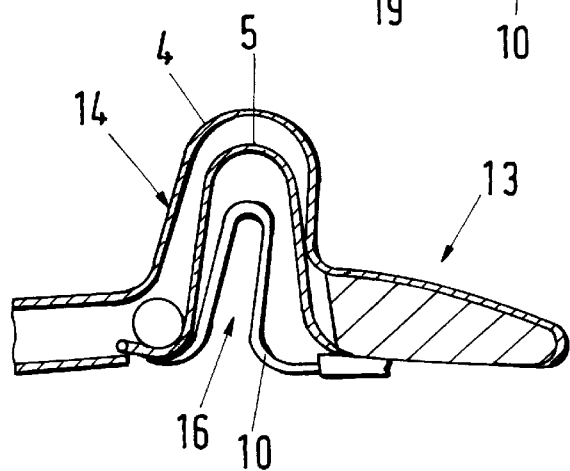
FIG. 3 is a schematic fragmentary sectional view of a collapsed roof portion with a roof handhold in a storage position.

As shown in FIG. 3, the cabriolet roof 2, in changing from the open position shown in FIGS. 1 and 2 into the storage configuration 13, is longitudinally collapsible between the points of handhold attachment 8 and 9, thereby reducing the distance between them, and the handhold is foldable in a roof fold 14 extending transversely to the longitudinal direction of the vehicle and bulging toward the outside of the roof. Thus, the handhold 10 is deformed into the transverse fold of the roof 14 by the forced movement of the points of handhold attachment 8 and 9 toward each other, changing from the service position 15 into an outwardly bulging storage position 16 so as to be accommodated in the fold 14.

To assure that this predetermined folding and bulging of the handhold 10 occurs when the roof is collapsed, articulations 18, 19 and 20 in the form of hinges of flexible material are provided at the points of handhold attachment 8 and 9 and in a mid-portion 17 of the handhold 10. These articulations 18, 19 and 20 are designed to have preferential directions of deformation. This assures that, when the cabriolet roof 2 is folded and the handhold 10 consequently bulges between its attachment points, the arched shape of the handhold 10, which normally is directed into the interior of the vehicle, is inverted into a bulge extending into the transverse fold 14 material of the roof. Such preferential directions of deformation are achieved, for example, by conventional thinning of the handhold material, stops, tabs, differential elasticities of material, and composite materials, in the region of the articulations 18, 19 and 20.

Although the invention has been described herein with reference to specific embodiments, many modifications and variations therein will readily occur to those skilled in the art. Accordingly, all such variations and modifications are included within the intended scope of the invention.

I claim:

1. A vehicle having a roof handhold arrangement comprising:

a vehicle having a collapsible roof with a collapsible frame structure; and a roof handhold comprising an elastically deformable handhold connected at each end to attachment points on the collapsible frame structure so that frame structure is foldable at least between the attachment points to reduce the distance between them;

the handhold being deformable into a roof fold extending transverse to the longitudinal direction of the vehicle so as to bulge during collapsing of the roof toward the outside of the roof and to be accommodated in the roof fold in the collapsed condition of the roof.

2. A vehicle having a roof handhold arrangement according to claim 1 wherein the collapsible roof comprises spaced, articulately connected longitudinal frame members and/or transverse frame members connected to and covered by at least one web of fabric providing a roof canopy, and wherein the attachment points are located on separate longitudinal and/or transverse frame members respectively.

3. A vehicle having a roof handhold arrangement according to claim 1 wherein the collapsible roof comprises an outer skin and an inner skin which are both folded upon collapsing of the collapsible roof and wherein that the handhold and its attachment points are located below the inner skin.

4. A vehicle having a roof handhold arrangement according to claim 1 wherein the handhold is articulated at at least one of the handhold attachment points and an intermediate portion of the handhold.

5. A vehicle having a roof handhold arrangement according to claim 4 wherein the handhold articulation is a hinge of flexible material.

6. A vehicle having a roof handhold arrangement according to claim 4 wherein the spacing of the attachment points with the collapsible roof in service position is less than the full length of the handhold so that the handhold has an arched shape directed toward the interior of the vehicle in its service position.

7. A vehicle having a roof handhold arrangement according to claim 4 wherein the articulations of the handhold have preferential directions of deformation so that, upon collapsing of the collapsible roof, the handhold has a shape diverted toward the outside of the roof and extending into an outward transverse fold of the roof end, upon opening of the collapsible roof, the handhold is restored to a service position directed toward the interior of the vehicle.

8. A vehicle having a roof handhold arrangement according to claim 1 wherein the handhold has a flat strip configuration with flat portions forming a bulge.

9. A vehicle having a roof handhold arrangement according to claim 1 wherein the handhold comprises a core of nylon fabric and a plastic jacket.

\* \* \* \* \*